United States Patent
Saleem et al.

(10) Patent No.: US 11,938,658 B1
(45) Date of Patent: Mar. 26, 2024

(54) MULTI-FUNCTIONAL FREESTANDING THIN FILMS PRODUCED USING PLASTIC WASTE AND METHODS THEREOF

(71) Applicant: KING FAISAL UNIVERSITY, Al-Ahsa (SA)

(72) Inventors: Junaid Saleem, Al-Ahsa (SA); Safdar Hossain Sk, Al-Ahsa (SA); Zubair Khalid Baig Moghal, Al-Ahsa (SA); Gordon McKay, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/119,235

(22) Filed: Mar. 8, 2023

(51) Int. Cl.
| | |
|---|---|
| B29C 49/00 | (2006.01) |
| B29C 41/00 | (2006.01) |
| B29C 41/08 | (2006.01) |
| B29K 105/04 | (2006.01) |
| B29K 105/26 | (2006.01) |

(52) U.S. Cl.
CPC .......... B29C 41/085 (2013.01); B29C 41/003 (2013.01); *B29K 2105/041* (2013.01); *B29K 2105/26* (2013.01)

(58) Field of Classification Search
CPC . B32B 2307/73; B32B 2272/00; C08L 23/06; B29C 2791/001; B29C 49/0005
See application file for complete search history.

(56) References Cited

U.S. PATENT DOCUMENTS

| | | | |
|---|---|---|---|
| 2014/0106127 A1* | 4/2014 | Lyons | C09D 7/67 427/164 |
| 2019/0256716 A1 | 8/2019 | De Coninck et al. | |
| 2021/0031151 A1 | 2/2021 | Lee et al. | |
| 2021/0388230 A1 | 12/2021 | Matus et al. | |

FOREIGN PATENT DOCUMENTS

WO  2021/129863 A1  7/2021

OTHER PUBLICATIONS

Erbil, H. Yildirim, et al. "Transformation of a simple plastic into a superhydrophobic surface." Science 299.5611 (2003): 1377-1380.
Norrman, K., Afshin Ghanbari-Siahkali, and N. B. Larsen. "6 Studies of spin-coated polymer films." Annual Reports Section C (Physical Chemistry) 101 (2005): 174-201.
Song, Junlong, et al. "Development and characterization of thin polymer films relevant to fiber processing." Thin Solid Films 517 (2009): 4348-4354.
Saleem, Junaid, et al. "Reusable Macroporous Oil Sorbent Films from Plastic Wastes." Polymers 14.22 (2022): 4867.
Saleem, Junaid, et al. "Free-standing polypropylene porous thin films using energy efficient coating technique." Energy Reports 9 (2023): 31-39.
Saleem, Junaid, et al. "A facile energy-efficient approach to prepare super oil-sorbent thin films." Energy Reports 9 (2023): 40-45.

* cited by examiner

*Primary Examiner* — Gregory Listvoyb
(74) *Attorney, Agent, or Firm* — Nath, Goldberg & Meyer; Richard C. Litman

(57) ABSTRACT

Freestanding microporous thin films, made using plastic waste, can be used as a hydrophobic coating, filtration membranes, or oil-sorbents. A method for producing the microporous thin film involves dissolving the plastic in an organic solvent to obtain a solution; and applying the solution onto a solid substrate through spin-coating followed by controlled heating, resulting in a freestanding porous thin film. Plastic waste comprises recycled polyethylene (PE), polypropylene (PP), polyvinyl chloride (PVC), or polystyrene (PS), recovered from a waste plastic material derived from post-consumer and/or industrial waste. The approach of fabricating multi-functional thin films from plastic waste combines an effective way to address multiple environmental issues simultaneously.

9 Claims, 3 Drawing Sheets

MULTI-FUNCTIONAL FREESTANDING THIN FILMS PRODUCED USING PLASTIC WASTE AND METHODS THEREOF

BACKGROUND

1. Field

The disclosure of the present patent application relates to multifunctional freestanding thin films produced using plastic waste.

2. Description of the Related Art

Thin film composite (TFC) membranes refer to separation membranes which are semi-permeable and are composed of a selective layer that determines separation performance and a porous support that provides mechanical stability. TFC membranes are currently used as a key material in the membrane separation processes for water treatment and seawater desalination. As a support of the TFC membrane, a porous polysulfone or polyethersulfone support having a surface pore size of 10 to 100 nm is generally used, and as a selective layer, polyamide-based materials are widely used. The selective layer is generally synthesized by interfacial polymerization of amine and acyl chloride monomers dissolved in two immiscible solvents such as water and n-hexane.

It is common that selective layers with different structures are prepared using different types of amine monomers so as to realize the separation performance of the TFC membrane for a reverse osmosis (RO) or nanofiltration (NF) grade. Recently, efforts have been made to improve the separation performance of the TFC membrane by optimizing polymerization conditions, using various additives, or applying post-treatment with acids and organic solvents. For example, cases in which the separation performance of the thin film composite membrane is improved by post-treatment of a polyamide selective layer with an acid or organic solvent or by coating the same with dopamine, glycerin, or polyethylene glycol have been reported.

The post-treatment method with organic solvents, referred to as a solvent activation process, is known as a simple and effective method to improve the separation performance of the membrane. However, since polysulfone or polyethersulfone, which are conventional support materials of the TFC membrane, have poor organic solvent resistance, there is a limitation to the solvents that can be used for activation. In addition, most solvent activation methods have the disadvantage in that the permeability of the TFC membrane is not significantly improved, or the salt rejection of the TFC membrane is significantly compromised. Therefore, there is a need for the development of a novel method that can solve these problems.

Thus, new thin film composite membranes, as well as processes for producing them, solving the aforementioned problems are desired.

SUMMARY

The present subject matter is directed to a method for making a freestanding thin film with micropores using recycled material which is recovered from a waste plastic or polymer material derived from post-consumer and/or industrial waste. The method includes depositing a solution of the recycled material on a substrate, removing the solvent, and separating the thin film from the substrate. The recycled material comprises one or more of polypropylene, polyethylene, polyvinyl chloride, and polystyrene.

In one embodiment, the present subject matter relates to a method of making a freestanding thin film with micropores, the method comprising: mixing a polymer material selected from the group consisting of polypropylene (PP), polyethylene (PE), polyvinyl chloride (PVC), polystyrene (PS), and any mixture or combination thereof in an organic solvent to form a solution; stirring the solution to obtain a stirred solution; pouring the stirred solution on a solid substrate to form a first coated solid substrate; spin coating the first coated solid substrate until the solvent is removed from a surface of the solid substrate to obtain a second coated solid substrate; and removing a polymer thin film from the second coated solid substrate to obtain the freestanding thin film with micropores.

In another embodiment, the present subject matter relates to a freestanding thin film with micropores produced according to the present methods.

These and other features of the present subject matter will become readily apparent upon further review of the following specification.

DETAILED DESCRIPTION OF THE PREFERRED EMBODIMENTS

Figure 1:
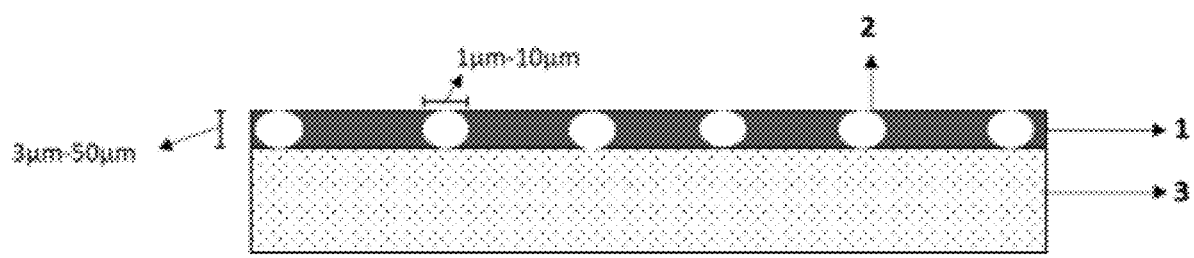
FIG. 1 is a cross-sectional view of a microporous thin film laid on a solid substrate.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to freestanding microporous thin films made using plastic waste which can be used as a hydrophobic coating, filtration membranes, or oil-sorbents. A method for producing the microporous thin film involves dissolving the plastic in an organic solvent to obtain a solution; and applying the solution onto a solid substrate through spin-coating followed by controlled heating, resulting in a freestanding microporous thin film. Plastic waste comprises recycled polyethylene (PE), polypropylene (PP), polyvinyl chloride (PVC), or polystyrene (PS), recovered from a waste plastic material derived from post-consumer and/or industrial waste. The approach of fabricating multi-functional thin films from plastic waste combines an effective way to address multiple environmental issues simultaneously.

In one embodiment, the present subject matter relates to a method of making a freestanding thin film with micropores, the method comprising: mixing a polymer material selected from the group consisting of polypropylene (PP), polyethylene (PE), polyvinyl chloride (PVC), polystyrene (PS), and any mixture or combination thereof in an organic solvent to form a solution; stirring the solution to obtain a stirred solution; pouring the stirred solution on a solid substrate to form a first coated solid substrate; spin coating the first coated solid substrate until the solvent is removed from a surface of the solid substrate to obtain a second coated solid substrate; and removing a polymer thin film from the second coated solid substrate to obtain the freestanding thin film with micropores.

In certain embodiments, the polymer material can be a waste polymer material selected from the group consisting of waste polypropylene (PP), waste polyethylene (PE), waste polyvinyl chloride (PVC), and waste polystyrene (PS). In further embodiments in this regard, the waste polymer material can be recycled material recovered from post-consumer or industrial waste.

In another embodiment, the stirring in the method can be conducted for about 5 to about 60 minutes. Similarly, in another embodiment the spin coating can be conducted for about 1 to about 15 minutes at an rpm of about 100 to about 6000, wherein the substrate can be placed on a spin coater chuck, with the polymer solution being poured onto the substrate and the spin coating is carried out. According to this embodiment, following the spin coating, excess polymer material and solvent can be collected from a drain.

In a further embodiment, the removing of the polymer thin film from the second coated solid substrate can comprise separating the polymer thin film from the substrate. According to this embodiment, the thin film can be peeled from the substrate using a blade, a tweezer or forceps without further heating to achieve freestanding thin films. In certain circumstances, this procedure can be used when the polymer is polyvinyl chloride or polystyrene.

In an alternative embodiment, the removing the polymer thin film from the second coated solid substrate can comprise subjecting the polymer thin film to heat at a temperature up to or above the melting point of the polymer(s) in the polymer thin film for about 5 seconds to about one hour. According to this embodiment, the heat can be at a temperature of about 80 to about 170° C. The heat can help enhance the strength of the thin film. In certain circumstances, this procedure can be used when the polymer is polypropylene or polyethylene. After heating, the thin film can be separated from the substrate easily without much effort. The obtained thin film can be used independently without any support and has sufficient strength to be labeled as a freestanding thin film. Upon gradual heating of the polymer, the internal fractures at the nano-level can start to heal. This can increase the crosslinking of the polymer chains because of the intermolecular forces that strengthen the thin films.

In additional embodiments, the organic solvent can be selected from the group consisting of dichloromethane, tetrahydrofuran, dimethyl sulfoxide, N,N-dimethyl formamide, dichloroethane, 1,4-dioxane, chloroform, tetrachloromethane, ethyl acetate, dimethylacetamide, acetone, acetonitrile, ethanol, methanol, isopropyl alcohol, butyl alcohol, methylethyl ketone, cyclohexanone, cyclopentanone, dioxane, p-xylene, m-xylene, o-xylene, an isomeric mixture of xylenes, toluene, nitrobenzene, decalin, mesitylene, N-methyl pyrrolidone, chlorobenzene, and any mixture or combination thereof. In this regard, the polymer can be mixed with the organic solvent at a ratio of about 1 mg/ml to about 400 mg/ml. In certain embodiments, the polymer can be dissolved in the organic solvent at a temperature below the boiling point of the polymer, particularly when the polymer is polypropylene or polyethylene. In other embodiments, the polymer can be dissolved in the organic solvent at room temperature, particularly when the polymer is polyvinyl chloride or polystyrene.

Suitable, non-limiting, examples of solid substrates usable herein include glass, copper, silicon, alumina, or other metal surfaces. The surface temperature of the solid substrate before the spin coating process can range from 0° C. to 190° C., but below the boiling point of the solvent.

In another embodiment, the present subject matter relates to a freestanding thin film with micropores produced according to the methods as described herein. In certain embodiments, thin films made according to this method can have one or more of a tensile strength of about 1 MPa to about 120 MPa, a thickness of about 800 nm to 100 μm, micropores of about 200 nm to about 50 μm, and a porosity of about 1 to about 75%. In further embodiments, these thin films can have a thickness of about 1 μm to about 50 μm, or about 3 μm to about 30 μm; micropores of about 500 nm to about 30 μm, or about 1 μm to about 10 μm; or a tensile strength of up to 80 MPa.

In further embodiments, the thin film of the present subject matter can have an oil or organics uptake capacity of about 90 to about 110 g/g measured immediately after taking out the film from an oil bath, and of about 50 to about 65 g/g measured after oil dripping stopped. This can permit the present thin films to have an oil or liquid recovery of 97% by simple mechanical squeezing a top and bottom surface of the thin film.

In additional embodiments, the thin film can comprise a non-fibrous, flexible, oleophilic and hydrophobic material, with no piercing, slitting, sealing, or folding on any portion of the thin film.

Figure 2:
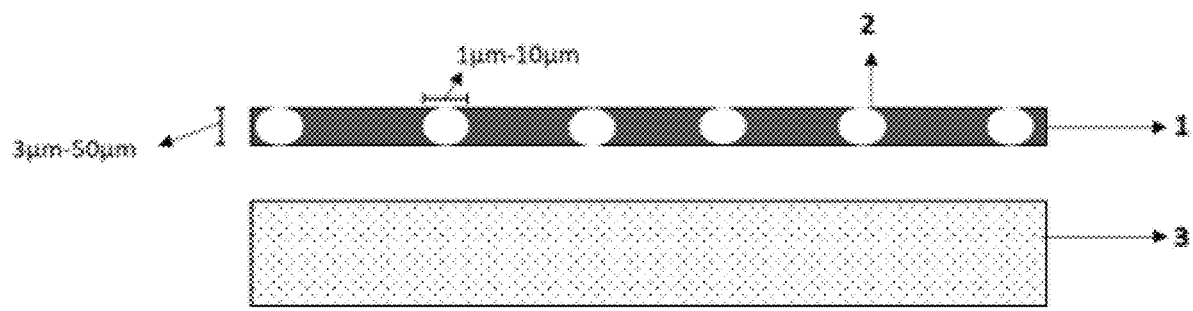
FIG. 2 is a cross-sectional view of a microporous thin film separated from the solid substrate.

Referring to FIGS. 1 and 2, the thin film 1 having micropores 2 can be removed and/or separated from the solid substrate 3. Once removed, the thin film can be allowed to dry under vacuum or air to remove traces of organic solvents present inside the micropores, if any.

In this regard, FIG. 1 represents a schematic cross-sectional view of a microporous thin film. A microporous thin film can be prepared from plastic waste comprising recycled polyethylene (PE), polypropylene (PP), polyvinyl chloride (PVC), or polystyrene (PS), recovered from a waste plastic material derived from post-consumer and/or industrial waste using the spin coating technique. The thickness of the thin film 1 can range from about 800 nm to about 100 μm, from about 1 μm to about 50 μm, or from about 3 μm to about 30 μm. The micropores 2 that are formed in the thin film during spin coating can be through pores and can range from about 200 nm to about 50 μm, from about 500 nm to about 30 μm, more preferably from about 1 μm to about 10 μm. The thin porous film on the substrate 3 prepared using the spin coating method shown in FIG. 1 is not yet peeled off. The thin film cannot be peeled off because the as-prepared thin film does not have sufficient strength to maintain its structure when separated. Upon peeling the thin film at this phase, the film can break to pieces because of weak mechanical structure and low strength.

FIG. 2 represents a schematic cross-sectional view of a microporous thin film. A microporous thin film can be prepared from plastic waste comprises recycled polyethylene (PE), polypropylene (PP), polyvinyl chloride (PVC), or polystyrene (PS), recovered from a waste plastic material derived from post-consumer and/or industrial waste using the spin coating technique. The thickness of the thin film 1 can range from about 800 nm to about 100 μm, from about 1 μm to about 50 μm, or from about 3 μm to about 30 μm. The micropores 2 that are formed in the thin film during spin coating can be through pores and can range from about 200 nm to about 50 μm, from about 500 nm to about 30 μm, or from about 1 μm to about 10 μm. The thin film on the substrate 3 prepared using the spin coating method shown in FIG. 1 is not yet peeled off. The solid substrate can be a glass surface or metal surface. The glass substrate can be placed on a hot surface of temperature ranging from about 80° C. to about 200° C., from about 120° C. to about 140° C., or above the melting point of the polymer.

After heating the thin film to the above-mentioned temperature, the polymer chains can interconnect to strengthen the film, allowing the film to be peeled off using a blade or tweezer resulting in a freestanding thin film 1 without any structure collapse. The thin film can be independently held without any other support, either complex support or individual micropore support. The thin film 1 can comprise micropores that range from about 200 nm to about 50 μm, from about 500 nm to about 30 μm, or from about 1 μm to about 10 μm.

Figure 3A:
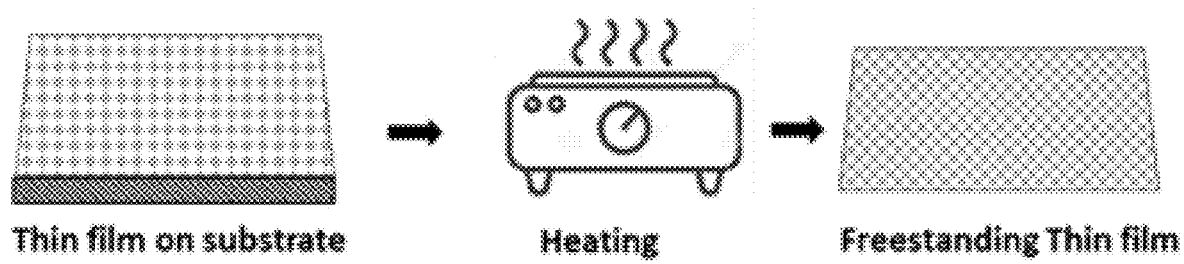
FIG. 3A shows a process of obtaining freestanding thin films using heating.

As shown in FIG. 3A, after the spin coating process, the substrate with thin film is detached from the chuck and is subjected to heat to obtain a freestanding thin film. The heating in this process can be done by keeping the thin film with substrate over a hot plate for a period ranging from 5 seconds to one hour at a temperature up to the melting point of the polymer. For example, HDPE thin film was kept on a hot plate for 2 minutes at 130° C. During this time, the white powdered thin weak layer turned to a microporous freestanding thin film. Then, the thin film was separated easily from the substrate and used as a freestanding thin film.

Figure 3B:
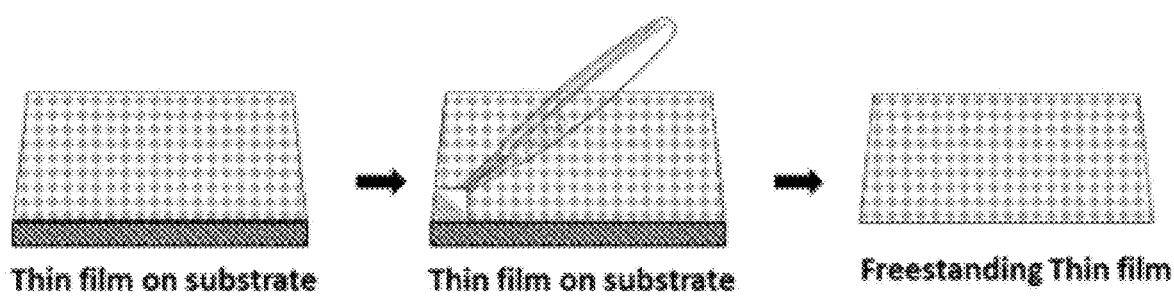
FIG. 3B shows a process of obtaining freestanding thin films using a tweezer or forceps.

A shown in FIG. 3B, after detaching the thin film with substrate from the chuck, the thin film was separated from the substrate without further heating using a forceps or tweezer or a blade, etc.

It is to be understood that the microporous thin films are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A method of making a freestanding thin film with micropores, the method comprising:
mixing a polymer material selected from the group consisting of polypropylene (PP), polyethylene (PE), polyvinyl chloride (PVC), polystyrene (PS), and any mixture or combination thereof in an organic solvent to form a solution;
stirring the solution to obtain a stirred solution;
pouring the stirred solution on a solid substrate to form a first coated solid substrate;

spin coating the first coated solid substrate until the solvent is removed from a surface of the solid substrate to obtain a second coated solid substrate;

collecting an excess polymer material and an excess solvent from a drain following the spin coating step; and removing a polymer thin film from the second coated solid substrate to obtain the freestanding thin film with micropores;

wherein the spin coating is conducted for about 1 to about 15 minutes at an rpm of about 100 to about 6000.

2. The method of claim 1, wherein the polymer material is a waste polymer material selected from the group consisting of waste polypropylene (PP), waste polyethylene (PE), waste polyvinyl chloride (PVC), and waste polystyrene (PS).

3. The method of claim 2, wherein the waste polymer material is recycled material recovered from post-consumer or industrial waste.

4. The method of claim 1, wherein the stirring is conducted for about 5 to about 60 minutes.

5. The method of claim 1, wherein the removing the polymer thin film from the second coated solid substrate comprises separating the polymer thin film from the substrate.

6. The method of claim 1, wherein the removing the polymer thin film from the second coated solid substrate comprises subjecting the polymer thin film to heat at a temperature up to or above the melting point of the polymer(s) in the polymer thin film for about 5 seconds to about one hour.

7. The method of claim 6, wherein the heat is at a temperature of about 80 to about 170° C.

8. The method of claim 1, wherein the organic solvent is selected from the group consisting of dichloromethane, tetrahydrofuran, dimethyl sulfoxide, N,N-dimethyl formamide, dichloroethane, 1,4-dioxane, chloroform, tetrachloromethane, ethyl acetate, dimethylacetamide, acetone, acetonitrile, ethanol, methanol, isopropyl alcohol, butyl alcohol, methylethyl ketone, cyclohexanone, cyclopentanone, dioxane, p-xylene, m-xylene, o-xylene, an isomeric mixture of xylenes, toluene, nitrobenzene, decalin, mesitylene, N-methyl pyrrolidone, chlorobenzene, and any mixture or combination thereof.

9. The method of claim 1, wherein the polymer is mixed with the organic solvent at a ratio of about 1 mg/ml to about 400 mg/ml. method of claim 7, wherein the vitamin is Vitamin C and HPLC retention time is about 1.5 minutes to about 2 minutes.

\* \* \* \* \*